United States Patent
Wang et al.

(10) Patent No.: US 10,831,678 B2
(45) Date of Patent: Nov. 10, 2020

(54) MULTI-TIER CACHE PLACEMENT MECHANISM

(71) Applicant: Arm Limited, Cambridge (GB)

(72) Inventors: Jiajun Wang, Austin, TX (US); Prakash S. Ramrakhyani, Austin, TX (US); Wei Wang, Cambridge (GB); Wendy Arnott Elsasser, Austin, TX (US)

(73) Assignee: Arm Limited, Cambridge (GB)

( * ) Notice: Subject to any disclaimer, the term of this patent is extended or adjusted under 35 U.S.C. 154(b) by 252 days.

(21) Appl. No.: 15/819,460

(22) Filed: Nov. 21, 2017

(65) Prior Publication Data

US 2019/0155750 A1    May 23, 2019

(51) Int. Cl.
*G06F 12/126* (2016.01)
*G06F 12/0862* (2016.01)
*G06F 12/0811* (2016.01)
*G06F 12/0888* (2016.01)

(52) U.S. Cl.
CPC ........ *G06F 12/126* (2013.01); *G06F 12/0811* (2013.01); *G06F 12/0862* (2013.01); *G06F 12/0888* (2013.01); *G06F 2212/1008* (2013.01); *G06F 2212/1021* (2013.01); *G06F 2212/608* (2013.01)

(58) Field of Classification Search
CPC ............. G06F 12/0811; G06F 12/0862; G06F 12/0888; G06F 112/12–128; G06F 2212/608; G06F 2212/6082; G06F 2212/1008; G06F 2212/1021
See application file for complete search history.

(56) References Cited

U.S. PATENT DOCUMENTS

| | | | |
|---|---|---|---|
| 9,652,243 B2 * | 5/2017 | Burcea | G06F 9/3836 |
| 10,684,859 B2 * | 6/2020 | Ho | G06F 9/3838 |
| 2014/0281228 A1 * | 9/2014 | O'Broin | G06F 3/061 |
| | | | 711/118 |
| 2015/0347302 A1 | 12/2015 | Hagersten et al. | |
| 2017/0293565 A1 | 10/2017 | Priyadarshi et al. | |
| 2017/0293571 A1 | 10/2017 | Sheikh et al. | |

\* cited by examiner

*Primary Examiner* — Harry W Byrne
*Assistant Examiner* — R Lance Reidlinger
(74) *Attorney, Agent, or Firm* — Leveque IP Law, P.C.

(57) ABSTRACT

Storage of data in a cache system is controlled by a cache monitor. A cache line is filled in response to a memory instruction from a cache client. The cache monitor includes a predictor table and update logic. An entry in the predictor table comprises an instruction identifier that associates the entry with a memory instruction and, for each cache in the system, a reuse counter. The update logic is configured to update a reuse counter table dependent upon cache behavior in response to memory instructions. Storage of data a first data address in cache in response to a memory instruction having a first instruction identifier, is dependent upon reuse counter values in an entry of the predictor table associated with first instruction identifier. Reuse counters are updated dependent upon cache behavior. A Bloom filter or other data structure may be used to associate data addresses with a memory instruction.

19 Claims, 11 Drawing Sheets

| HASHED IP | L1 COUNT | L2 COUNT | L3 COUNT |
|---|---|---|---|
| 502 | 504 | 506 | 508 |
| 502 | 504 | 506 | 508 |
| 502 | 504 | 506 | 508 |
| ⋮ | ⋮ | ⋮ | ⋮ |
| 502 | 504 | 506 | 508 |

| COUNTER VALUE | INFERENCE |
|---|---|
| 000 | BYPASS |
| 001 | BYPASS |
| 010 | INSERT, LOW PRIORITY |
| 011 | INSERT, LOW PRIORITY |
| 100 | INSERT, LOW PRIORITY |
| 101 | INSERT, HIGH PRIORITY |
| 110 | INSERT, HIGH PRIORITY |
| 111 | INSERT, HIGH PRIORITY |

| HASHED IP | CACHE ACCESS BEHAVIORAL INFORMATION ||||||| L3 TRAIN RESULT |
| --- | --- | --- | --- | --- | --- | --- | --- |
| | L1 STATS | L2 STATS | L3 STATS | ADDRESS FILTER | L1 TRAIN RESULT | L2 TRAIN RESULT | |
| 902 | 904 | 906 | 908 | 910 | 912 | 914 | 916 |
| 902 | 904 | 906 | 908 | 910 | 912 | 914 | 916 |
| 902 | 904 | 906 | 908 | 910 | 912 | 914 | 916 |
| ----- | ----- | ----- | ----- | ----- | ----- | ----- | ----- |
| 902 | 904 | 906 | 908 | 910 | 912 | 914 | 916 |

MULTI-TIER CACHE PLACEMENT MECHANISM

BACKGROUND

A cache is a memory for temporary storage of data in a data processing apparatus. Commonly, a cache is a smaller, high-speed memory that stores copies of a subset of data from a backing storage device. The backing storage device is typically a larger, slower memory or data storage device. The data in the cache is used by a cache client, such as a central processing unit (CPU). Performance of the CPU is enhanced when often used data is available in the cache, thus avoiding latency associated with reading data from the backing storage device.

A multi-tier cache system may contain multiple cache levels, ranging from the smallest fastest cache closest to the CPU to the largest, slowest cache closest to memory.

Since the storage capacity of a cache is limited, it is quickly filled and a replacement policy is used to determine which line in the cache is evicted to make space for a new line. For example, the least recently used (LRU) cache line may be evicted.

This approach may be inefficient. For example, new data retrieved from a main memory may only ever be used once, in which case there is no advantage to storing the data in a cache. A need exists, therefore, to determine when new data should be stored in a cache and when they should bypass the cache and go directly to CPU.

In addition, data placement in a given level multi-tier cache may undesirable if the data is not reused in that level. A further need exists, therefore, to determine which cache level or levels to be used for storing new data.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

FIG. 5 illustrates a predictor table in accordance with an embodiment of the disclosure.

FIG. 6 is a table illustrating cache placement dependent upon reuse counter values, in accordance with an embodiment of the disclosure.

FIG. 9 shows an example of a further predictor table, consistent with embodiments of the disclosure.

DETAILED DESCRIPTION

Figure 1:
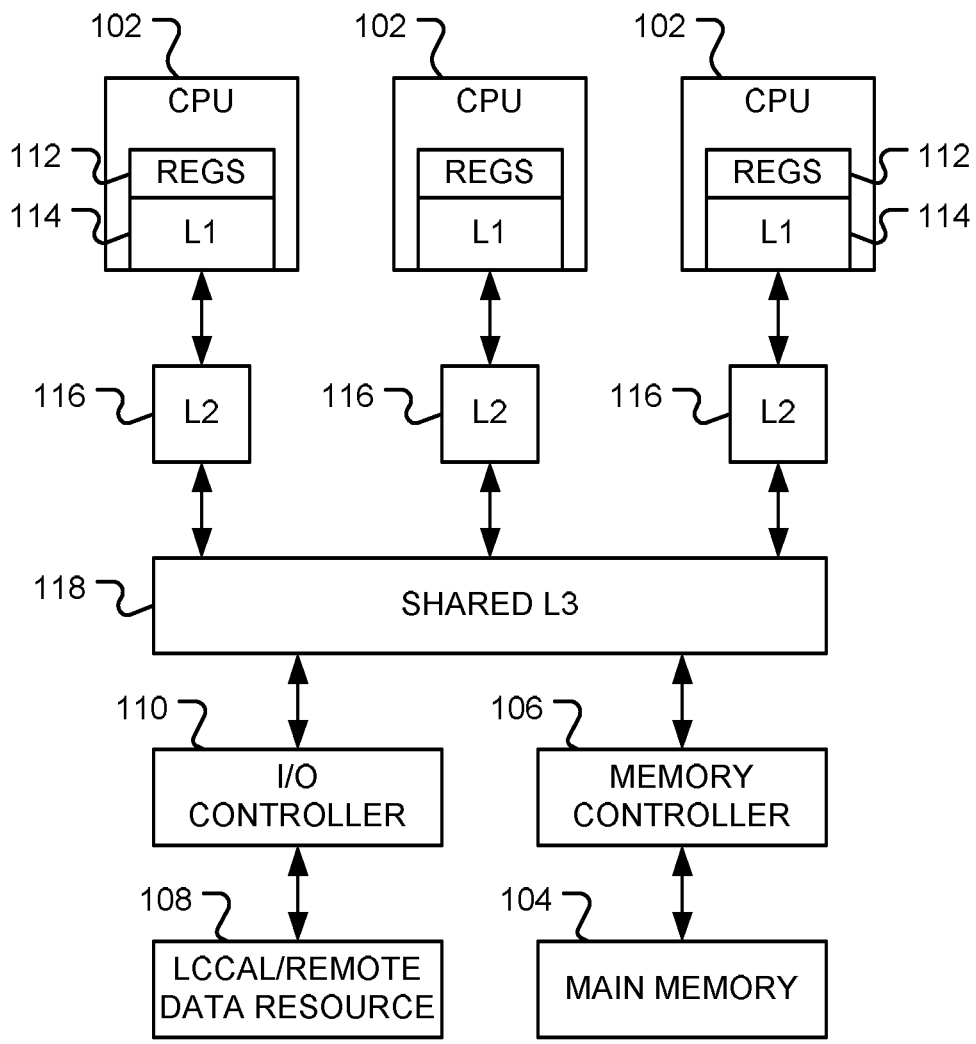
FIG. 1 is a block diagram of a data processing system, in accordance with various representative embodiments.

While this present disclosure is susceptible of embodiment in many different forms, there is shown in the drawings and will herein be described in detail specific embodiments, with the understanding that the present disclosure is to be considered as an example of the principles of the present disclosure and not intended to limit the present disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Various embodiments of the present disclosure relate to a mechanism for placing data in a multi-tier cache.

FIG. 1 is a simplified block diagram of a data processing apparatus 100 in accordance with various embodiments of the disclosure. The apparatus includes one or more data processors 102, such as one or more central processing units (CPU's). Data processors 102 access data stored in main memory 104, via a memory controller 106. Data processors 102 may also access data from local or remote data resources 108 via interface controller 110. Interface controller 110 may be an input/output (I/O) interface controller or network interface controller. In general, data processing apparatus 100 may include multiple memory controllers and interface controllers.

Memory 104 may be a random access memory (RAM), such as a dynamic RAM (DRAM) or static RAM (SRAM) for example.

In one embodiment, data resource 108 includes a backing storage device having a larger storage capacity than memory 104, or a slower access time. For example, backing storage device 108 may be a memory, a storage class memory (SCM), flash memory, solid state memory, hard disk drive (HDD), other type of storage, or a combination thereof. Backing storage device 108 may provide non-volatile storage, volatile storage, or a combination thereof.

In general, the access time of main memory 104 is slower compared to an instruction time of a CPU 102. In order to enable faster operation of the CPU, intermediate caches are used. In the example configuration shown, CPU 102 may store data in on-chip registers 112 and level one (L1) cache 114. In turn, each CPU (or CPU cluster) may use a larger but slower level two cache 116. In addition, a shared level three (L3) cache 118 may be provided. The L1, L2 and L3 caches form a multi-tiered cache system. When data is retrieved from memory 104 or data resource 108, is may be placed in one or more caches in the cache system.

Memory 104 may be coupled to the data processor 102 and cache system via a bus structure and memory controller 108. For example, the bus structure 308 may be a 64-bit wide DDR bus.

If a data block loaded in a cache is never reused, or is evicted before it is reused, no performance improvement is gained through use of the cache. Indeed, there may be a performance degradation if the data block replaces causes eviction of another data block (the 'victim' data block) that will be reused in the near future.

Figure 2:
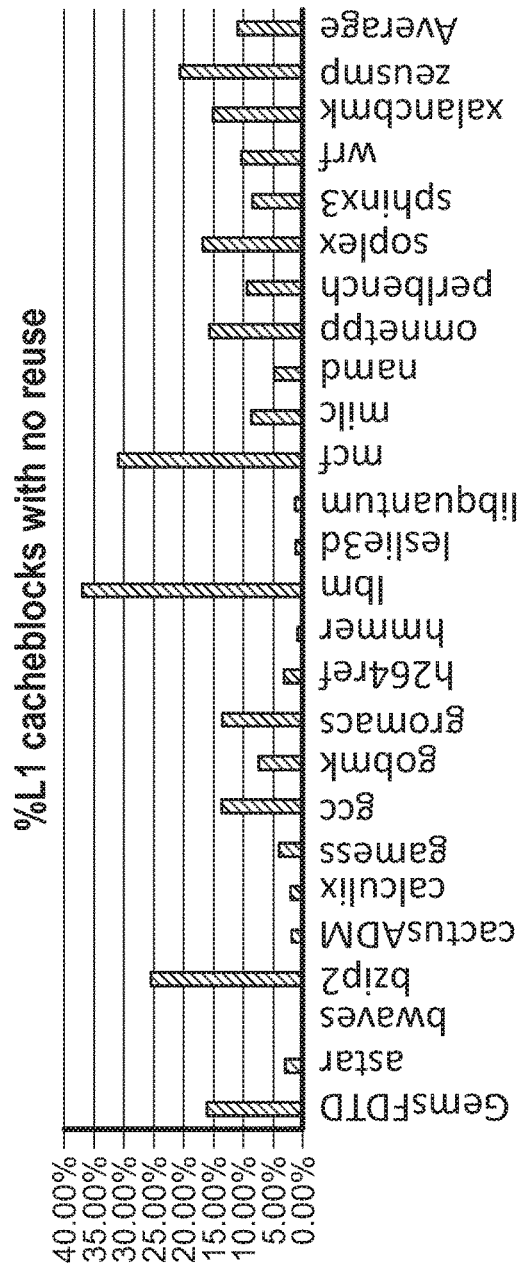
FIG. 2 and FIG. 3 are bar graphs showing the proportion of cache blocks that are not reused before being evicted from the cache for a number of different benchmark workloads.
Figure 3:
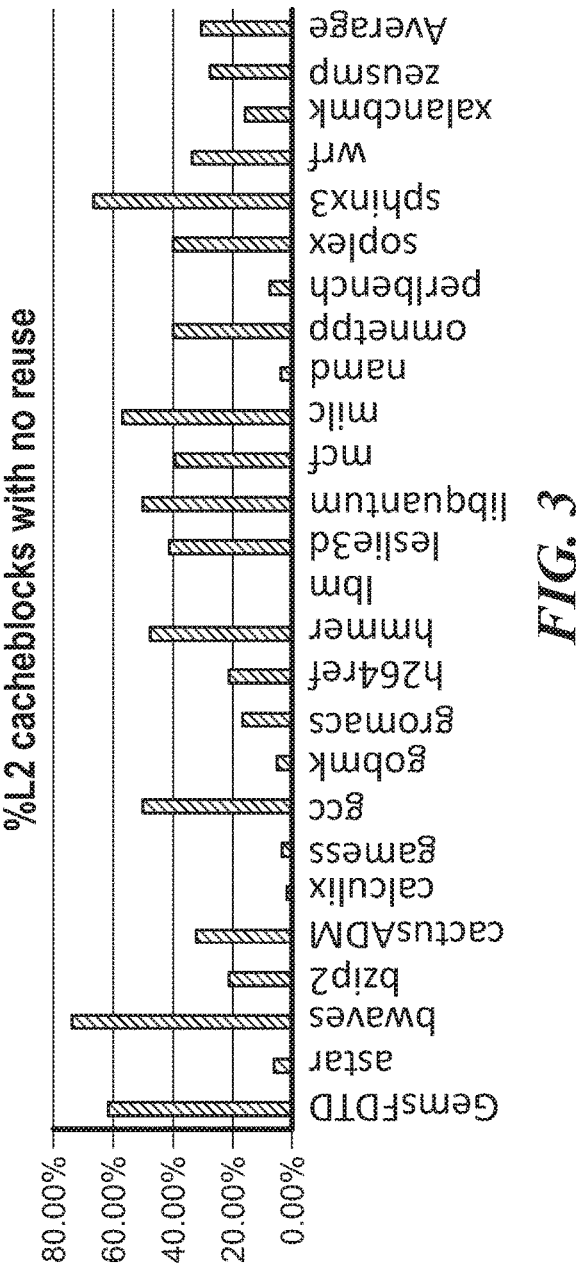

FIG. 2 and FIG. 3 are bar graphs showing the proportion of cache blocks that are not reused before being evicted from the cache for a number of different benchmark workloads. FIG. 2 shows the proportion for an L1 cache, while FIG. 3 shows the proportion for an L2 cache. A cache block that it is not reused during its lifetime in a cache is referred to as a 'dead block'. In addition to not providing performance benefit, allocating cache space for such dead blocks consumes energy. In contrast, if dead blocks are not inserted into cache and don't cause victim block eviction, cache pollution is avoided and the chance of cache hit on the victim block is increased. FIGS. 2 and 3 show that, in some applications, a significant proportion of data blocks allocated to the cache are dead blocks that not reused before being evicted. Thus, there is a potential to make more effective use of the caches.

One aspect of the present disclosure relates to the optimization, in a single step, of cache allocation at all levels of cache hierarchy to reduce the allocation of cache space to dead blocks.

Sequential execution of a program results in a sequence of data access. The 'reuse distance' is defined as the number of distinct data blocks accessed between two consecutive uses of the same element. The reuse distance is also referred to as the re-reference distance. If each distinct data block is loaded into a cache prior to use, then it will be evicted before being reused if the capacity of the cache (the number of cache lines or blocks that can be stored) is less than the reuse distance. Since higher level caches typically have smaller capacities, the data will be evicted sooner. For example, data in a L2 cache may be reused before eviction while the same data in a smaller capacity L1 cache is evicted before use. Thus, it would be advantageous to place the data directly in the L2 and bypass the L1 cache.

Knowledge of the reuse distance for a particular access would enable an optimal allocation policy. For example, the reuse distance of a data block could be compared with the capacity of the cache into which the block is to be inserted. When reuse distance is larger than the cache capacity, the cache is bypassed. However, in practice the reuse distance is not known.

The present disclosure recognizes that individual memory instruction tends to have constant reuse distance and constant cache bypassing behavior. That is, the data reuse distances of cache blocks accessed by a given memory instruction are similar and result in same optimal cache bypassing decision.

Figure 4:
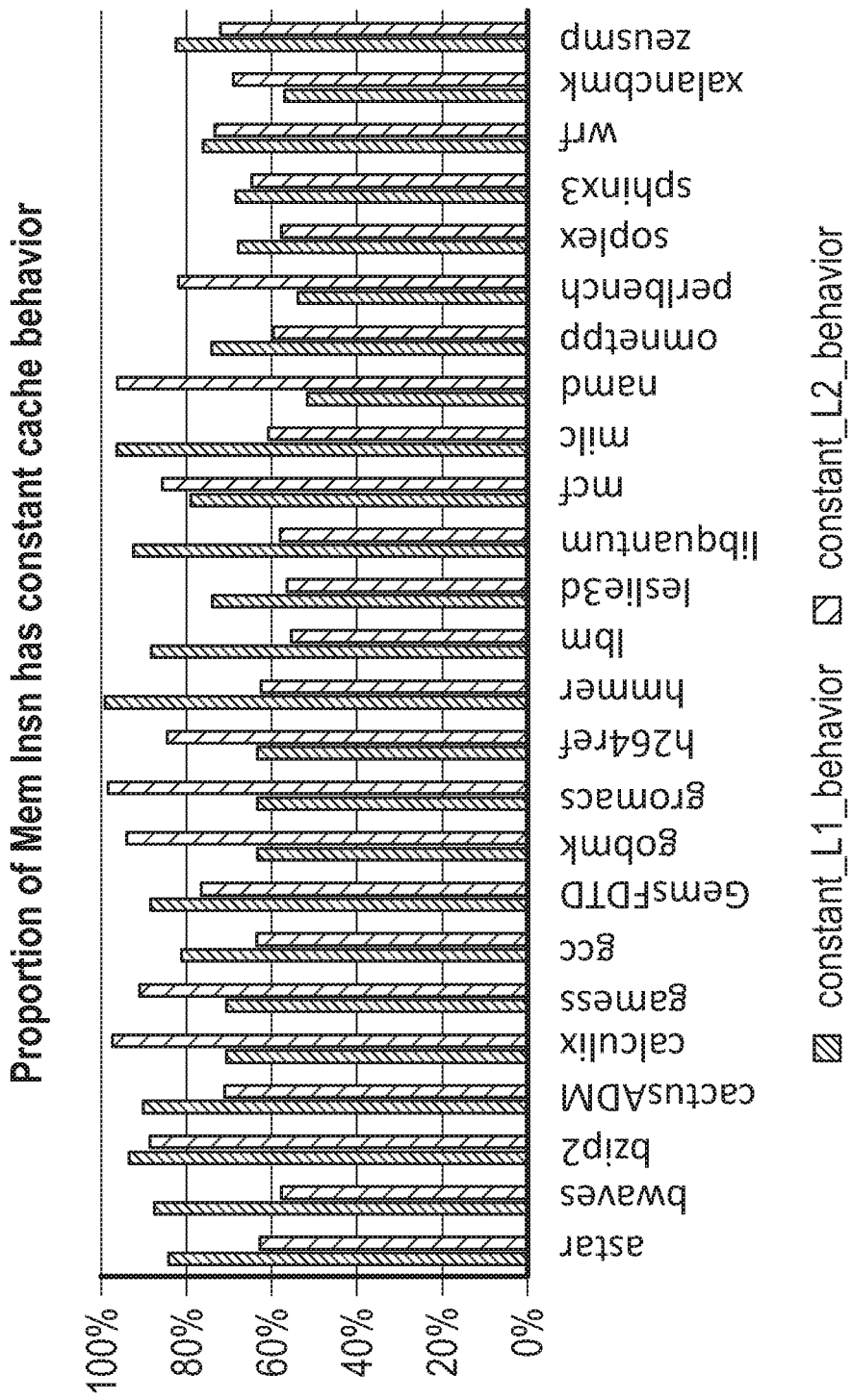
FIG. 4 is a bar chart showing the proportion of memory instructions that have near constant cache behavior.

FIG. 4 is a bar chart showing the proportion of memory instructions that have near constant cache behavior. The cache behavior—whether data is stored in a cache or the cache is bypassed—is determined by the reuse distance. Here, near constant is defined as having less than 10% change in behavior. That is, more than 90% of memory accesses by the same instruction result in the same cache behavior (bypass or not bypass). FIG. 4 shows the results for the Standard Performance Evaluation Corporation (SPEC) 'SPEC CPU2006' workloads. For each work load, the left bar denotes L1 cache behavior and the right bar denotes L2 cache behavior. At both L1 and L2 cache levels, more than half of memory instructions have near constant cache behavior.

The results in FIG. 4 indicate a correlation between a memory access instruction (identified by its instruction pointer, for example) and the reuse distance of the access data.

In accordance with an aspect of the disclosure, cache block allocation is determined dependent upon instruction pointers rather than explicit reuse distance. Cache block allocation is determined by prediction mechanisms based on instruction pointers or other instruction indicators. The mechanisms may be adaptive; using observations to learn the ideal cache levels in which to place a data block requested by a given memory instruction.

Each cache of a multi-tier cache system is configured to store a number of cache lines, each cache line comprising an address tag and a data block. A cache line is filled in response to a memory instruction from a cache client.

In accordance with various embodiments of the disclosure, a cache monitor is provided comprising a predictor table and associated update logic. An entry in the predictor table includes an instruction identifier that associates the entry with a memory instruction and, for each of the caches, a reuse counter. The update logic is configured to update a reuse counter of an entry in the predictor table dependent upon cache behavior in response to memory instructions. Responsive to execution of a memory instruction having a first instruction identifier, for data at a first data address, data at the first data address is stored in the multi-tier cache dependent upon reuse counter values in an entry of the predictor table, the entry associated with the first instruction identifier. A reuse counter of an entry in the prediction table associated with a memory instruction is updated in response to execution of a corresponding memory instruction. The reuse counter may be incremented when the memory instruction produces a cache hit and decremented when the memory instruction produces a cache miss.

An entry in the predictor table may include a prediction result for each of the caches, in which case the update logic is configured to update a prediction result of an entry dependent upon values of the reuse counters of the entry. The prediction results may be saved in a backing memory for later reuse. The backing memory, such as an ECC-DRAM, may be configured to access an instruction and associated metadata in a single transaction. The prediction result may be included in the metadata associated with an instruction.

An entry in the predictor table may include a Bloom filter, or its equivalent, that is used to keep track of memory addresses accessed by a particular instruction. In this implementation, the update logic of the cache monitor includes Bloom filter logic configured to update the Bloom filter of an entry, associated with the first memory instruction, with the first data address.

In one embodiment, when data associated with a second data address is evicted from a cache of multi-tier cache system, a reuse counter of an entry of the prediction table for which the Bloom filter contains the second address is incremented if the data at the second address was reused in the cache and decremented if the data at the second address was not reused in the cache.

Thus, a mechanism is provided for guiding placement of data blocks in a multi-tier cache. When data at a first data address, accessed by a memory instruction having a first instruction identifier, is not stored in a cache of the multi-tier cache, a prediction table is accessed, dependent upon the first instruction identifier, to retrieve reuse data associated with the first memory instruction and the cache. A data block containing the first data is retrieved from a lower order cache of the multi-tier cache or from a memory. Dependent upon the reuse data, the data block is either inserted into the multi-tier cache or the multi-tier cache is bypassed.

An entry in the prediction table may include an instruction identifier and, for each cache of the multi-tier cache, a reuse counter. The reuse counters of an entry are updated based upon observations of cache behavior result from the associated instruction. In one embodiment, when data at a first data address, accessed by a memory instruction having a first instruction identifier, is stored in a cache of the multi-tier cache (a cache 'hit'), the reuse counter in an entry of the prediction table associated with the first instruction identifier and the cache is incremented. When data at the first data address is not stored in a cache of the multi-tier cache (a cache 'miss'), the reuse counter in the entry of the prediction table associated with the first instruction identifier and the cache is decremented.

An entry in the prediction table may also include a Bloom filter. When data at the first data address, accessed by the memory instruction having the first instruction identifier, is not stored in the multi-tier cache, the first data address is added to the Bloom filter of a first entry in the prediction table (the entry associated with the first instruction identifier). A second entry of the prediction table is identified, for which the second data address in stored in the Bloom filter. When data at a second data address is evicted from a cache of the multi-tier cache, the reuse counter associated with the cache in the second entry of the prediction table is incremented when data at the second data address has been reused in the cache, and decremented when data at the second data address has not been reused in the cache.

A Bloom filter is a space-efficient probabilistic data structure used to test whether an element is a member of a set. Alternative data structures, such as a Quotient Filter, may be used without departing from scope of the present disclosure. Herein, the term 'probabilistic data structure' is taken to include Bloom filters and all alternative data structures that may be used to indicate when a data address is a member of a set of data addresses.

A cache line in the multi-tier cache may include a reuse bit that is set to zero when the cache line is inserted into the multi-tier cache and set to one when the cache line is reused. Data at the second data address is determined to have been reused or not dependent upon the reuse bit in an evicted cache line containing the data at the second data address. The second data address may be deleted from the Bloom filter of the second entry, and the second entry removed from the prediction table when the Bloom filter is empty.

An entry in the prediction table may include a prediction result for each cache of the multi-tier cache. A prediction result in an entry of the prediction table may be updated when a corresponding reuse counter crosses a threshold value, or periodically updated dependent upon a corresponding reuse counter.

When the first instruction identifier is not stored in prediction table, a new entry may be added to the prediction table. The instruction identifier of the entry is set to the first instruction identifier and reuse data of the entry is reset. A least recently used entry may be evicted from the prediction table and replaced with the new entry. The result of the evicted entry may be saved in a backing memory.

The disclosure is described in more detail below, with reference to the figures.

FIG. 5 illustrates a predictor table 500 in accordance with a first embodiment of the disclosure. Predictor table 500 is indexed by an identifier 502 of an instruction, such as instruction pointer (IP). A hash of the instruction pointer may be used, for example, to reduce the size of the predictor table 500. Each row of table 500 has an N-bit saturating reuse counter for each level of cache in the cache hierarchy. In the example shown, the cache hierarchy consists of L1, L2 and L3 caches and has corresponding counters 504, 506 and 508. On every miss at a given level of hierarchy, the counter corresponding to that level in the row identified by the instruction pointer is decremented. Similarly, on every hit the corresponding counter is incremented. Threshold counter values may be designated to infer cache allocation and determine, for example, when to bypass the cache, insert into the cache with low priority, or insert into the cache with high priority.

In the case that a cache in the cache hierarchy is shared between cache clients, a further identifier, in addition to the instruction pointer or program counter, may be used. For example, an address space identifier (ASID) may be used to distinguish between instructions from different processes.

Predictor table 500 may contain an entry for each memory instruction in an instruction cache. When an instruction is evicted from the instruction cache, the entry may be cleared. The contents of the entry may be saved to a backing store and reloaded into the table at a later time.

The table 600 shown in FIG. 6 is illustrates how cache placement may be guided using 3-bit reuse counters. When a counter value in column 602 for a given cache is less than 2 (binary 010), it is inferred that the cache is to be bypassed, as indicated by the inference in column 604. When a counter value for a given cache is greater than 4 (binary 100), the data is inserted in the cache with high priority (i.e. with a low chance of eviction). Otherwise, the data is inserted in the cache with low priority (i.e. with a higher chance of eviction).

Figure 7:
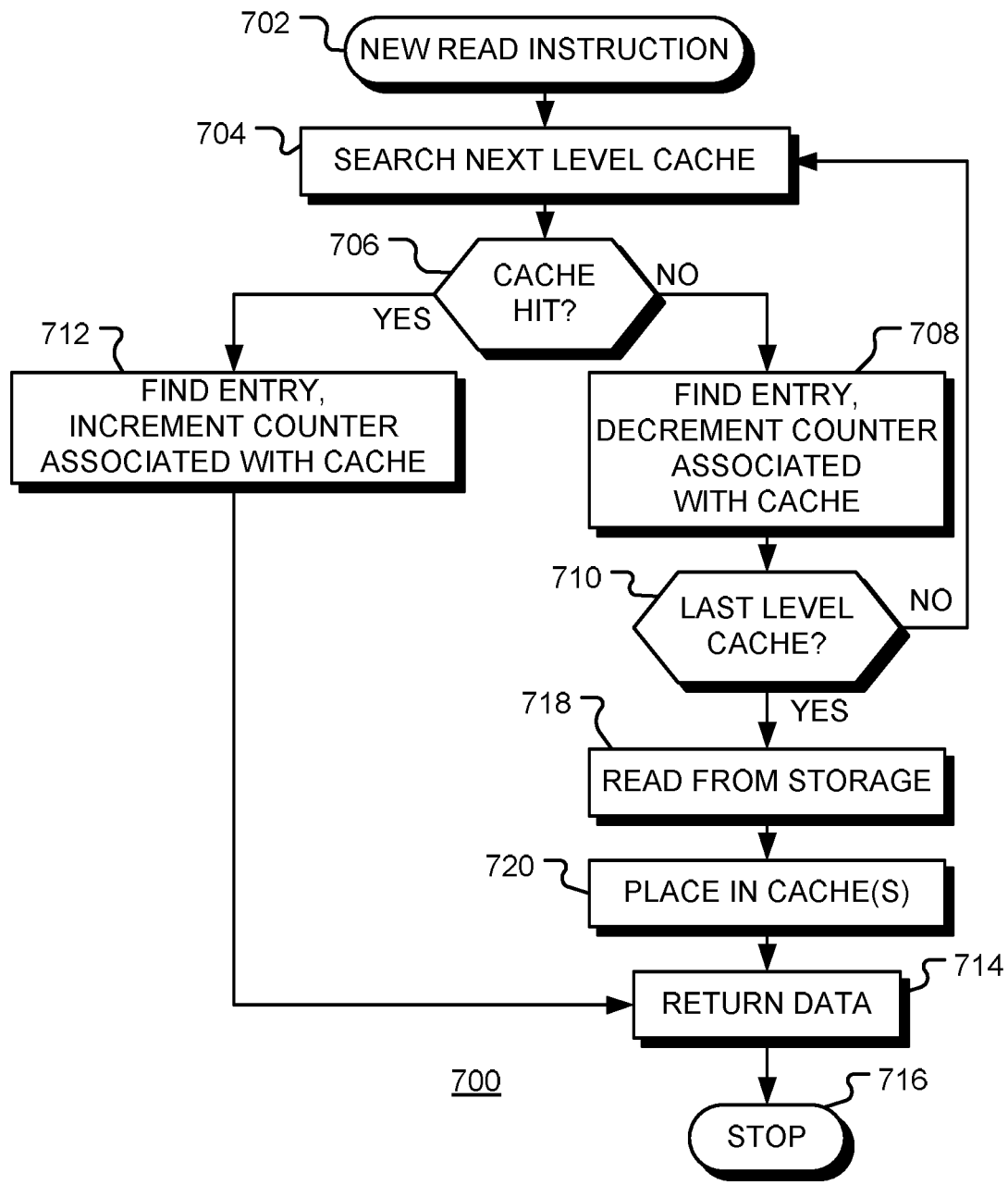
FIG. 7 is a flow chart of a method for cache placement, consistent with embodiments of the disclosure.

FIG. 7 is a flow chart of a method 700 for cache placement, consistent with embodiments of the disclosure. Following receipt of a read instruction from a cache client at block 702 for a data at a given address, the associated address tag is searched in the highest level (L1) cache at block 704. If the tag is not found ('misses') in the cache, as depicted by the negative branch from decision block 706, the entry in predictor table corresponding to the pointer of the read instruction is found and the counter associated with the cache and the instruction pointer is decremented at block 708. Flow continues to decision block 710. If the tag is found ('hits') in the cache, as depicted by the positive branch from decision block 706, the entry in predictor table corresponding to the pointer of the read instruction is found and the counter associated with the cache and the instruction pointer is incremented at block 712. The data is read from the cache and returned to the requesting cache client at block 714. The process terminates at block 716. If, following a cache miss, this is not the last level cache, as depicted by the negative branch from decision block 710, flow continues to block 704 and the next level cache is searched. When all caches have been searched, as depicted by the positive branch from decision block 710, the requested data has not been found in any cache of the multi-tier cache system. The data is read from a backing store at block 718, placed in one or more caches at block 720 (in accordance with the cache placement policy discussed in further detail below), and returned to the requesting cache client at block 714. The method terminates at block 716.

The method shown in FIG. 7, may be performed during a learning or training phase, to update reuse counters for each cache. The counters may then be used in an inference phase to guide cache placement. An example of the use of the reuse counter is provided in FIG. 8, discussed below.

The learning phase may continue for an assigned number of clock cycles, an assigned number of instructions, or an assigned number of memory accesses, or be applied only for a sampling of memory accesses over an assigned number of instructions/clock cycles/memory accesses, for example. Alternatively, the learning phase may be defined by software markers, inserted by a user for example, that indicate sections of code to be used for learning and sections of code for which inference is to be used. Such markers could also be used to reset the counters to a known initial state at the beginning of a learning phase.

Figure 8:
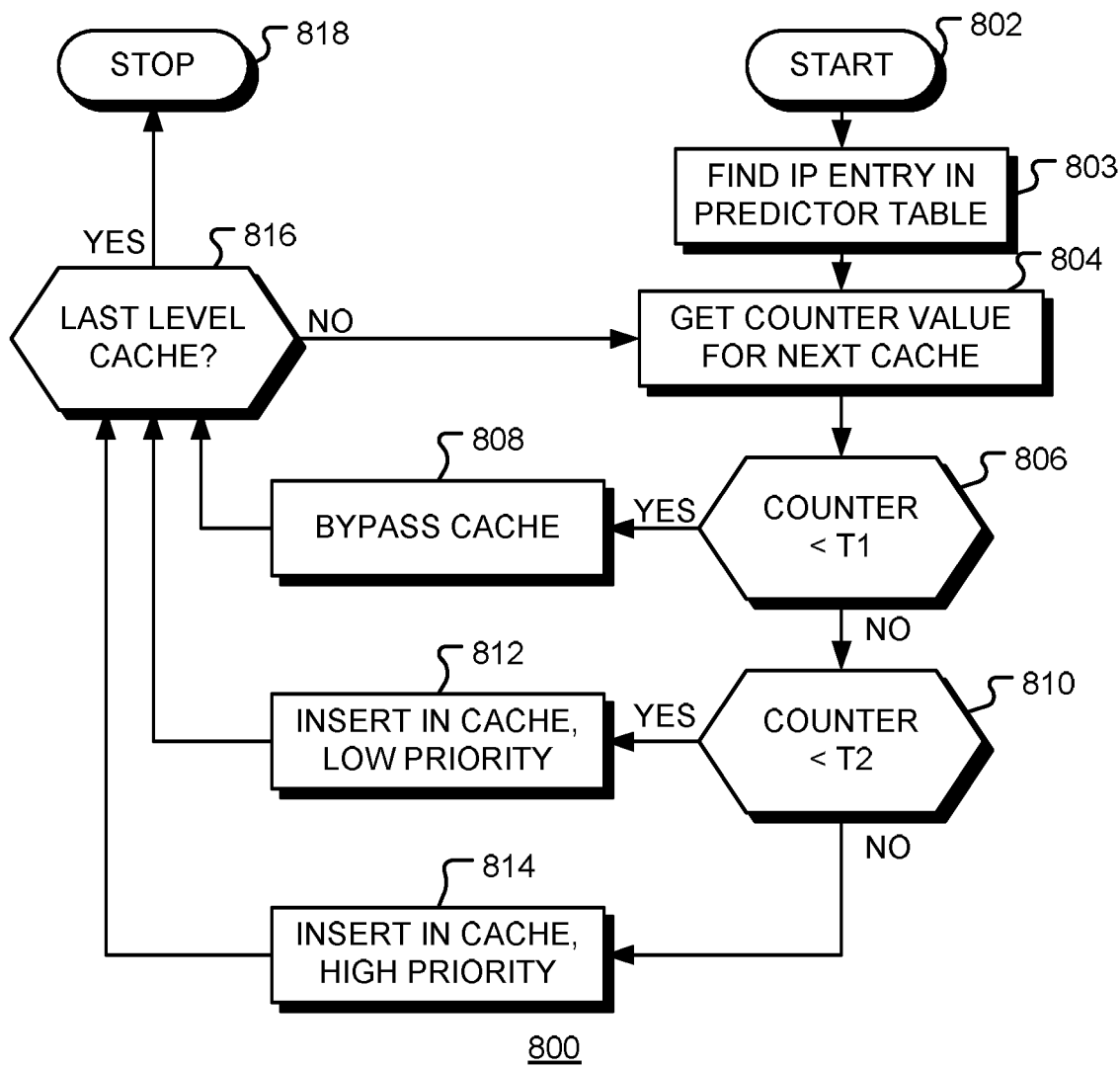
FIG. 8 is a further flow chart of a method of cache placement, consistent with embodiments of the disclosure.

FIG. 8 is a flow chart of a method 800 of cache placement, consistent with embodiments of the disclosure. The method may be performed at block 722 of the flow chart in FIG. 7, for example. Following start block 802, an entry corresponding to the read instruction is found in the predictor table at block 803 (using the instruction indicator as an index, for example). At block 804, the counter level for the next level cache (starting with the highest level cache) is retrieved from the entry. If the counter value is less than a lower threshold T1, as depicted by the positive branch from decision block 806, the cache is bypassed at block 808.

If the counter value is not less than the lower threshold T1 but is less than a higher threshold T2, as depicted by the positive branch from decision block 810, the retrieved data is inserted into the cache with a low priority at block 812.

If the counter value is not less than the higher threshold T2, as depicted by the negative branch from decision block 810, the retrieved data is inserted into the cache with a high priority at block 814.

Thus, placement of the retrieved data in this cache level is determined by the corresponding counter values associated with the memory instruction and by the threshold values T1 and T2. Once placement has be made for this cache level, flow continues to decision block 816. If this is the last level cache, as depicted by the positive branch from decision block 816, the method terminates at block 818. Otherwise, flow continues for block 804 and the placement is repeated for the next level cache.

The learned behavior may be dependent upon an initial prediction table and other initial conditions. In order to avoid the system becoming 'locked' into an inefficient condition, the cache placement decision may occasionally be made at random. This has the effect of changing the initial conditions and prevents to the system from locking. The random decision may be made periodically.

In a second embodiment of the disclosure, additional information is captured based on observations of the reuse of cached data due to spatial or temporal locality of data accesses. In the second embodiment, program execution is divided into phases. Cache allocation decisions in one phase use information learned in a previous phase. During each phase, cache behavior for each memory instruction is monitored and recorded. After each phase, the behavior information is used to assign a cache block allocation policy for the next phase. The next time a data read request is issued from the same memory instruction, the associated cache block allocation information is retrieved to indicate which level (or levels) of the cache hierarchy the data block should be placed in. The learned cache block allocation information may be stored and read from an ECC chip or from a separate memory, for example.

In one embodiment, program execution is divided into fixed length phases. For example, a phase may be the execution of a given number of instructions (100M for example) or a given number of memory read instructions. Information learned from a previous phase is used to guide cache allocation in the current phase.

FIG. 9 shows an example of a predictor table 700 that is updated during a training phase. The predictor table is updated in response to each memory instruction. The predictor table 700 may be either a key-value store structure, where hashed program counter (PC) or instruction pointer (IP) is the key and cache access behavior information is the value. Alternatively, the predictor table may be a structure similar to a direct-map-cache, where hashed PC or IP is used as a set index, pointing to the table entry that holds the data accesses behavior information.

In FIG. 9, table 900 is an example of a key-value store structure, where hashed instruction pointer (IP) 902 is the key for each row entry. The cache access behavior information in each entry includes statistics fields L1_stats (904), L2_stats (906), L3_stats (908), and address filter field (910), and results fields L1_train_result (912), L2_train_result (914), and L3_train_result (916). In one embodiment, each statistics field (904, 906, 908) in an entry for a particular memory instruction is 8-bit saturating counter whose value indicates the number of cache hits in the corresponding L1/L2/L3 cache encountered by data blocks accessed by that memory instruction. Other size counters may be used. Address filter 910 is a 16-bit Bloom filter that stores data addresses touched by the instruction. Other size Bloom filters may be used. Each result field (912, 914, 916) may be a one bit indicator of the training result from the previous training period. All fields are initialized to zero, except for result fields—which are preloaded with prior information (from a main memory or other store) when the instruction block is fetched from memory. Alternatively, result fields (912, 914, 916) may contain more than one bit so as to indicate a priority level, for example.

Whenever a memory instruction accesses data, the data address of the accessed data is hashed and inserted into address filter 910 for that instruction. In a hardware implementation, the Bloom filter logic can be shared among all address filters.

Data blocks are allocated in a cache in accordance with an allocation replacement policy. The policy may be a static re-reference interval prediction (SRRIP) policy, for example, in which a 2-bit re-reference prediction value (RRPVs) is maintained for each cache line. In this policy, RRPV value of a block is set to zero when a hit occurs. If a miss occurs, the first block with an RRPV of 3 is replaced with the requested data and its RRPV is set to 2. If no RRPV of 3 is found, all RRPV's are incremented and the process is repeated until a 3 is found.

In accordance with an embodiment of the present disclosure, when the RRPV value of a block is set to zero (i.e. when a hit occurs), an additional bit (a reuse bit) is set to indicate that the hit has occurred, i.e. that the data in the cache has been reused.

The L1_stats statistics counter 904 for a given memory instruction is incremented when the memory instruction has L1 cache hit and the RRPV value of the hit block is 0. When an L1 cache block eviction occurs, the address of evicted block is hashed and searched among all the address filters. This search may be performed in a serial manner for each memory instruction in turn. If a match is found, the L1_stats counter of the same corresponding memory address is decremented. L2_stats and L3_stats counters are updated in a similar way.

When an instruction cache line is evicted back to memory, its (virtual) address (i.e. the instruction pointer) is hashed and looked up in the predictor table. If there is an entry match, the associated data accesses behavior information is read and processed. The processing result is a 3-bit bitmap, with bits corresponding to L1, L2 and L3. In the bitmap, a logic 0 stands for inserting data into cache and logic 1 stands for bypassing cache. Logic 1 is set when the statistics counter value is zero, and vice versa. These three bits may be stored in main memory, either along with DRAM metadata or in the ECC DIMM, if available.

Figure 10:
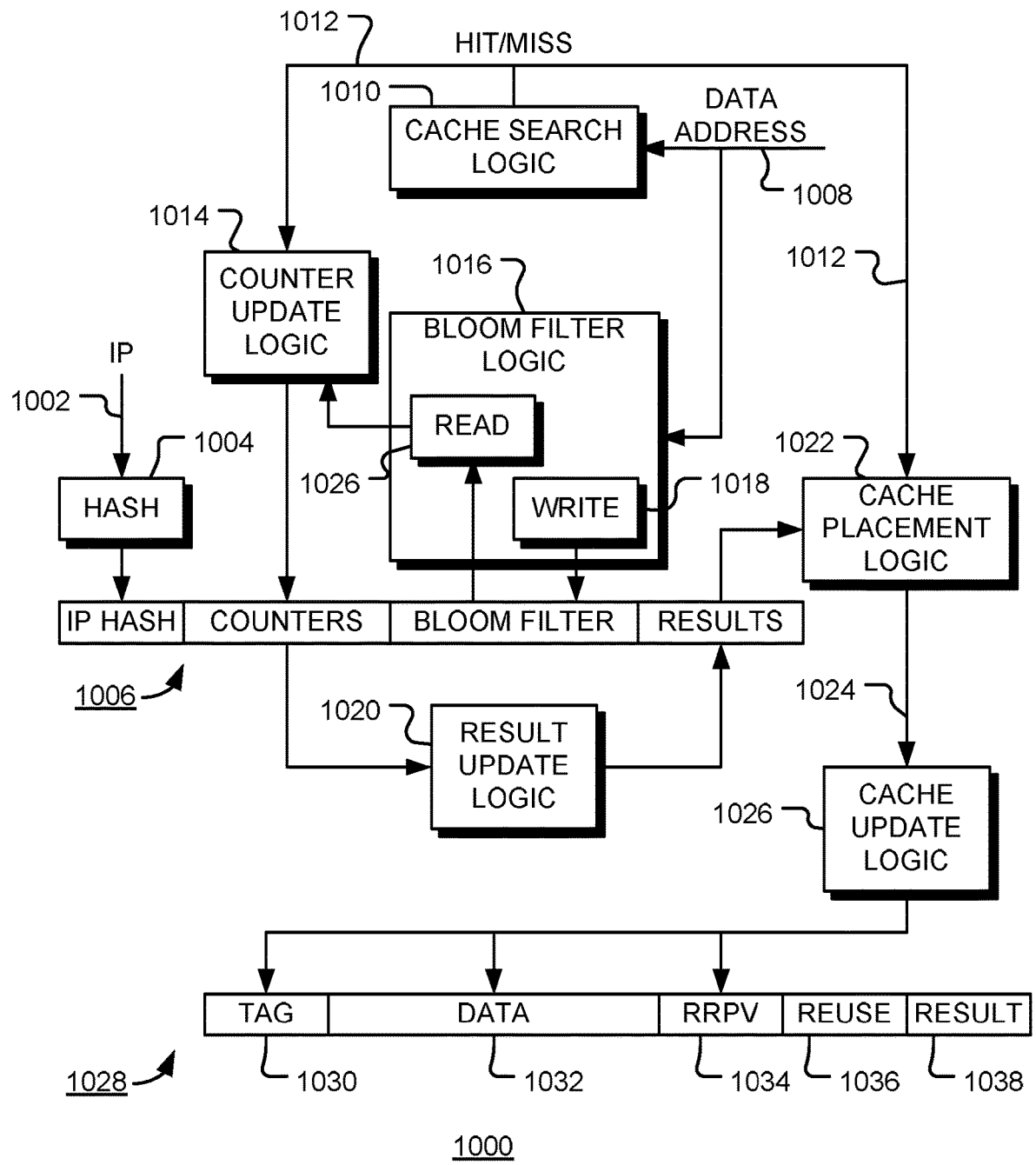
FIG. 10 is a block diagram of a multi-tier cache placement system, in accordance with embodiments of the disclosure.

FIG. 10 is a block diagram of a multi-tier cache placement system 1000 in accordance with embodiments of the disclosure. In operation, an instruction pointer 1002 of a memory instruction is passed through hash filter 1004 to provide an index to an entry 1006 of a predictor table. Data address 1008, or a corresponding address tag, associated the memory instruction, is passed to cache search logic 1010, which is used to determine if a corresponding data block is present in a cache. The result, hit/miss signal 1012, is passed to counter update logic 1014 that updates the appropriate counter field in table entry 1006. The data address 1008 (or a hash of the address) is also passed to Bloom filter logic 1016. The Bloom filter logic may include a number of hash functions that are used to identify bits of the Bloom filter field in entry 1006 to be set by write logic 1018.

At the end of each training phase, the counter values are used by result update logic 1020 to update the allocation results in the results field of entry 1006. In the event of a cache miss, cache placement logic 1022 determines if and where data retrieved from a backing store should be placed in the multi-tier cache. The decision, indicated by signal 1024, is guided by the allocation results in entry 1006. Cache update logic inserts the address tag, data, and appropriate re-reference prediction value (RRPV) into cache line 1028. The reuse indicator of the line is set to zero.

When data is evicted from a cache, the address of the evicted data is passed to Bloom filter logic 1016. The predictor table is searched one entry at a time, using read logic 1026, to find entries for instructions that may have accessed the address. It is noted that the Bloom filter may occasionally produce false positives. When a matching instruction is found, the counter for that cache and instruction is updated by counter update logic 1014.

Cache line 1028 includes address tag 1030, data block 1032, re-reference prediction value (RRPV) 1034, reuse indicator 1036 and result 1038. RRPV 1034 is updated in accordance with a replacement policy such as SRRIP. Reuse indicator 1036 is initialized to zero but set to one in the event of a cache hit on the line. Prediction result 1038 is set when the cache line is inserted and is used to indicate where, if anywhere, in the cache hierarchy the line should be inserted when it is evicted from the cache.

Figure 11:
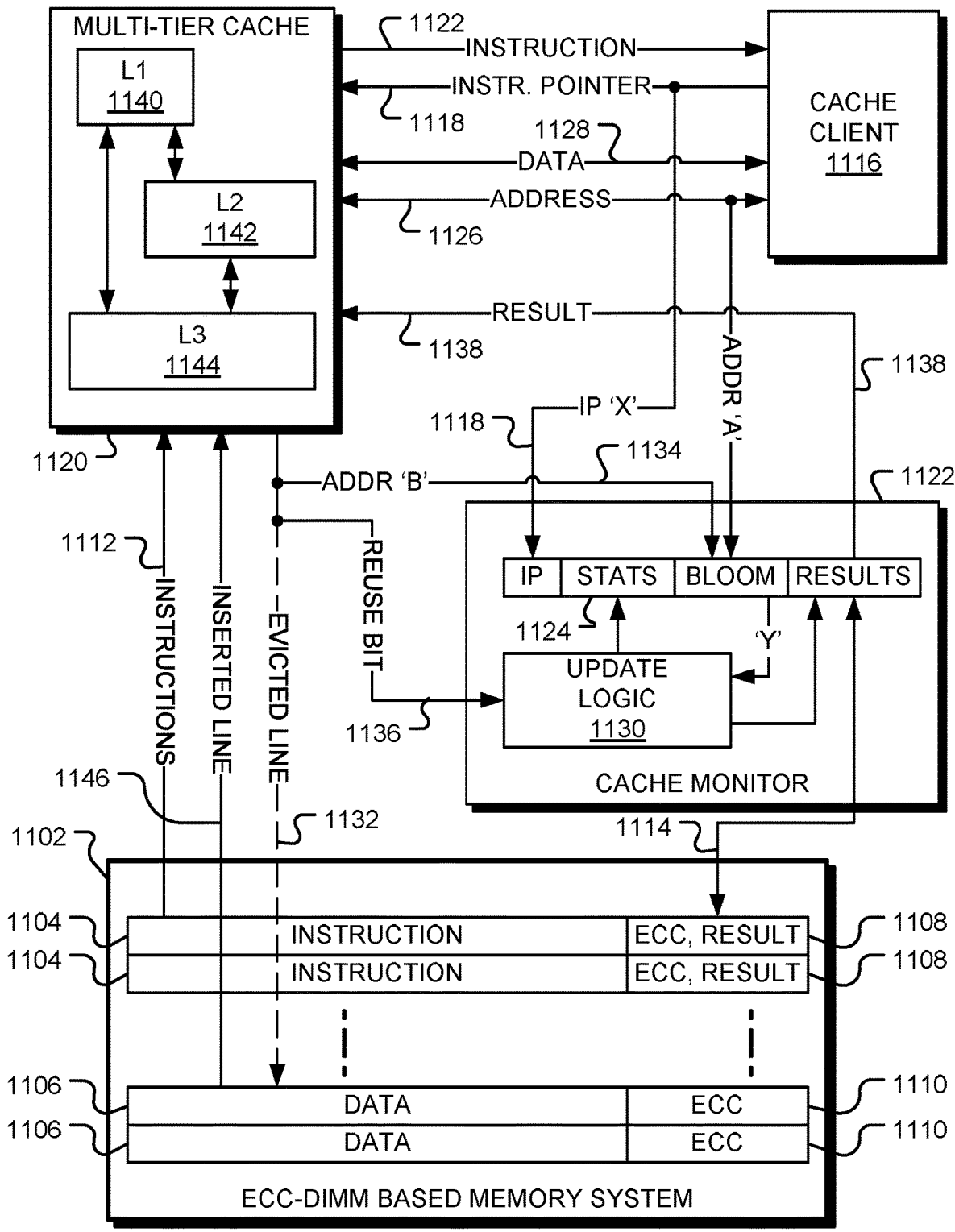
FIG. 11 is a simplified block diagram of a data processing apparatus, in accordance with various embodiments of the disclosure.

FIG. 11 is a simplified block diagram of a data processing apparatus 1100 in accordance with various embodiments of the disclosure. In this implementation, the memory 1102 comprises an ECC-DIMM memory. Each line (1104, 1106) of the ECC DIMM has addition storage (1108, 1110) for metadata such as an error correcting code (ECC). For example, an ECC DIMMs may have extra eight bytes storage per data block that can be used for storing either more comprehensive ECC code or other metadata. When a memory instruction is evicted from the instruction cache, the results may be saved to memory in the line 1104 corresponding to the instruction. In the case of an ECC-DIMM, some of the additional storage 1108 may be used for storing the prediction result described above. In a three-level cache system, for example, the result may consist of three bits per instruction. A line 1106 may contain multiple instructions, in which case storage 1108 may be allocated for results of each instruction. The advantage of storing prediction result in the ECC DIMM is that, when the instruction is reloaded into the instruction cache, a single memory transaction is sufficient to get both instruction 1112 and its prediction result 1114 (together with the ECC code and any other metadata) from memory 1102. Other lines, 1106, of the ECC-DIMM may be used for storing data and associated error correction codes. More generally, any memory may be used in which an error correction code is stored together with an instruction. Alternatively, the prediction result may be stored in a separate area of DRAM, in which case an additional memory transaction is needed to retrieve the prediction result when an instruction is loaded in the instruction cache.

The results stored in the memory may be initialized to a specified value that can be used to guide cache placement when an instruction is first loaded.

When processor or cache client 1116 requests an instruction associated with instruction pointer 1118 ('X' say) from cache system 1120, the cache system determines if the corresponding instruction is available in a cache. If not, an instruction is loaded into an instruction cache of multi-tiered cache system 1120. Instruction 1122 is provided to the processor 1116 for execution and, when the instruction is a memory instruction, cache monitor 1122 creates an entry in a predictor table 1124 for the corresponding instruction pointer 1118. The entry may be indexed by the instruction pointer, a hash of the instruction pointer, or some other identifier of the instruction.

In operation, when instruction pointer 1118 ('X') corresponds to a memory instruction, a data address 1126 ('A') is provided to the multi-tier cache 1120. The instruction pointer 1118 and data address 1126 are monitored by cache monitor 1122. Data address 1126 may be an address in a virtual address space, so one or more levels of address translation may be used to find a corresponding address tag to be searched in the multi-tier cache. In the event of a read instruction, data 1128 is returned to processor 1116 either from a cache in the multi-tier cache 1120 (in the case of a 'hit') or from memory 1102 (in the case of a 'miss'). In a first embodiment of the disclosure, the 'hit' or 'miss' information is passed to update logic 1130 of cache monitor 1122. In the event of a cache miss, the instruction triggering the event is searched in the predictor table and the result 1138 is used to select which cache (if any) the data 1146 should be inserted into.

In a second embodiment, instruction pointer 1118 ('X') is used to identify an entry in prediction table 1124, and address 1126 ('A') is added to the Bloom filter of that entry. Also in the second embodiment, update logic 1130 is responsive to cache line evictions, either evictions from a higher level cache to a lower level cache, or evictions 1132 to the memory 1102. In the event of a cache line eviction, the address tag 1134 of the line ('B' say) and a ruse bit 1136 are passed to the update logic 1130. The reuse bit is an indication of whether that cache line was reused after being placed in the cache. The address tag 1134 is searched in the Bloom filters of table 1124 and the reuse bit is used to update the statistics counters of the found entry and, as appropriate, the results for the found entry. The update process is described in more detail below with reference to FIG. 13. Again, in the event of a cache miss, the instruction triggering the event is searched in the predictor table 1124 and the result 1138 is used to select which cache (if any) the data 1146 should be inserted into.

Prediction results 1138 are passed to the multi-tier cache 1120. The results indicate which caches are to be updated with data loaded from memory 1102 and, optionally, a priority level for the inserted data.

Prediction results may be stored in ECC region 1108 of memory 1102 (or in other memory regions) as bitmaps. The use of a bitmap to store the prediction result enables the disclosed mechanism to be used with exclusive, inclusive or non-include, non-exclusive (NINE) cache systems. For example, in a multi-tier cache with L1 (1140), L2 (1142) and L3 (1144) caches, a dynamic cache line may have both low and high reuse distance. Consequently, there will be a greater number of both L1 hits and L3 hits. In this case, three-bit representation of '101' is able to suggest both L1 and L3 as optimal cache level locations.

The prediction results may also be stored in the cache and used to guide cache placement when lines are evicted. In the example above, '101' may indicate that data evicted from the L1 cache should be placed directly in the L3 cache, bypassing the L2 cache. When an evicted block is to be inserted back to a lower level of cache, the IP of the memory instruction that was used to allocate the evicted block is not available. In one embodiment, the result field is written into the metadata field of the data cache block. This makes the trained cache bypassing decisions available to guide cache allocation of the evicted block.

After the data access behavior information is processed and the prediction result is written back to main memory 1102, the table entry is invalidated from the predictor table 1124. At the end of each training period, all the remaining entries in the predictor table go through similar data accesses behavior information processing, and the result fields are updated accordingly. All statistics counters and address filter fields are also reset. This may occur for example, when the Bloom filter of an entry indicates that no data associated with the instruction is stored in any cache.

Figure 12:
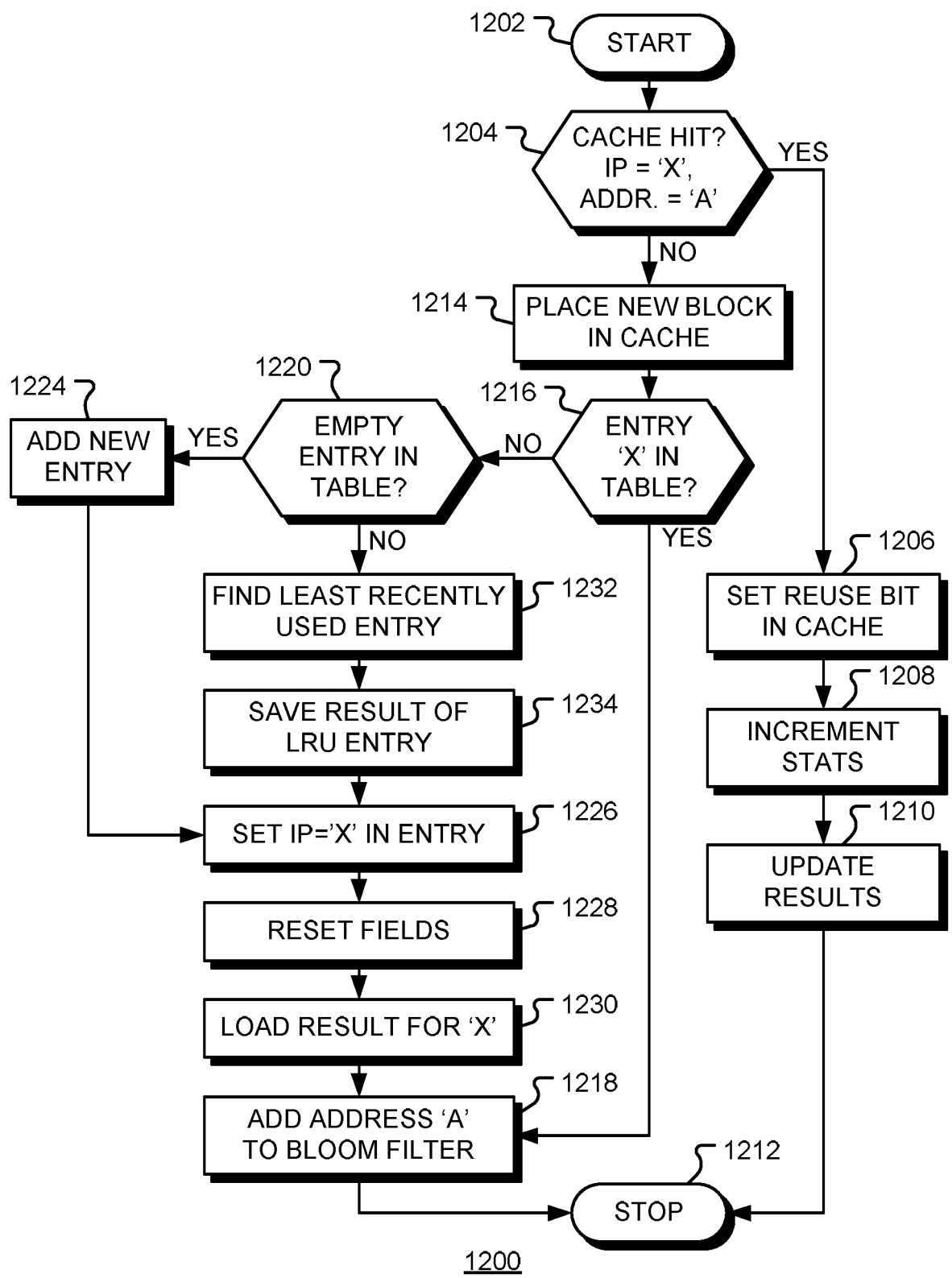
FIG. 12 is a flow chart of a method for updating a predictor table, in accordance with embodiments of the disclosure.

FIG. 12 is a flow chart of a method 1200 for updating a predictor table in accordance with embodiments of the disclosure. The method begins at start block 1202 when a new memory instruction, with instruction pointer 'X' and address 'A', is issued. At decision block 1204 it is determined if the data block associated with the address 'A' is present in a cache. If the data block is present (a 'hit'), as depicted by the positive branch from decision block 1204, the reuse bit for the cache line is set at block 1206. This bit indicates that the cache entry has been reused since the initial load into the cache. Optionally, at block 1208 the statistics counter of the entry for 'X' in the predictor table is incremented, and at block 1210 the results for the entry are update if necessary. In a further embodiment, the counter is only updated when the cache line is evicted from the corresponding cache. The method terminates at block 1212. However, if the data block is not present in the cache (a 'miss'), as depicted by the negative branch from decision block 1204, the requested data at address 'A' is retrieved from memory and placed in the cache at block 1214. If an entry for instruction pointer 'X' is already in the table, as depicted by the positive branch from decision block 1216, the address 'A' is added to the Bloom filter at block 1218 and the method terminates at block 1212. However, if there is no entry for instruction pointer 'X' in the table, as depicted by the negative branch from decision block 1216, a new entry must be added. If there is an empty entry in the table, as depicted by the positive branch from decision block 1220, a new entry is added at block 1224, the instruction pointer (IP) of the entry is set to 'X' at block 1226, and the statistics fields and Bloom filter are reset at block 1228. If prior results for this instruction are stored in memory, those results are loaded at block 1230. At block 1218 the address 'A' is added to the Bloom filter at block 1218 and the method terminates at block 1212. If there is no empty entry in the table, as depicted by the negative branch from decision block 1220, an old entry is evicted to make space. In the embodiment shown, the least recently used (LRU) entry is found at block 1232, the prediction results for this entry are saved to memory at block 1234. Flow then continues to block 1226 to begin inserting the new entry. Other eviction policies may be used without departing from the present disclosure.

Figure 13:
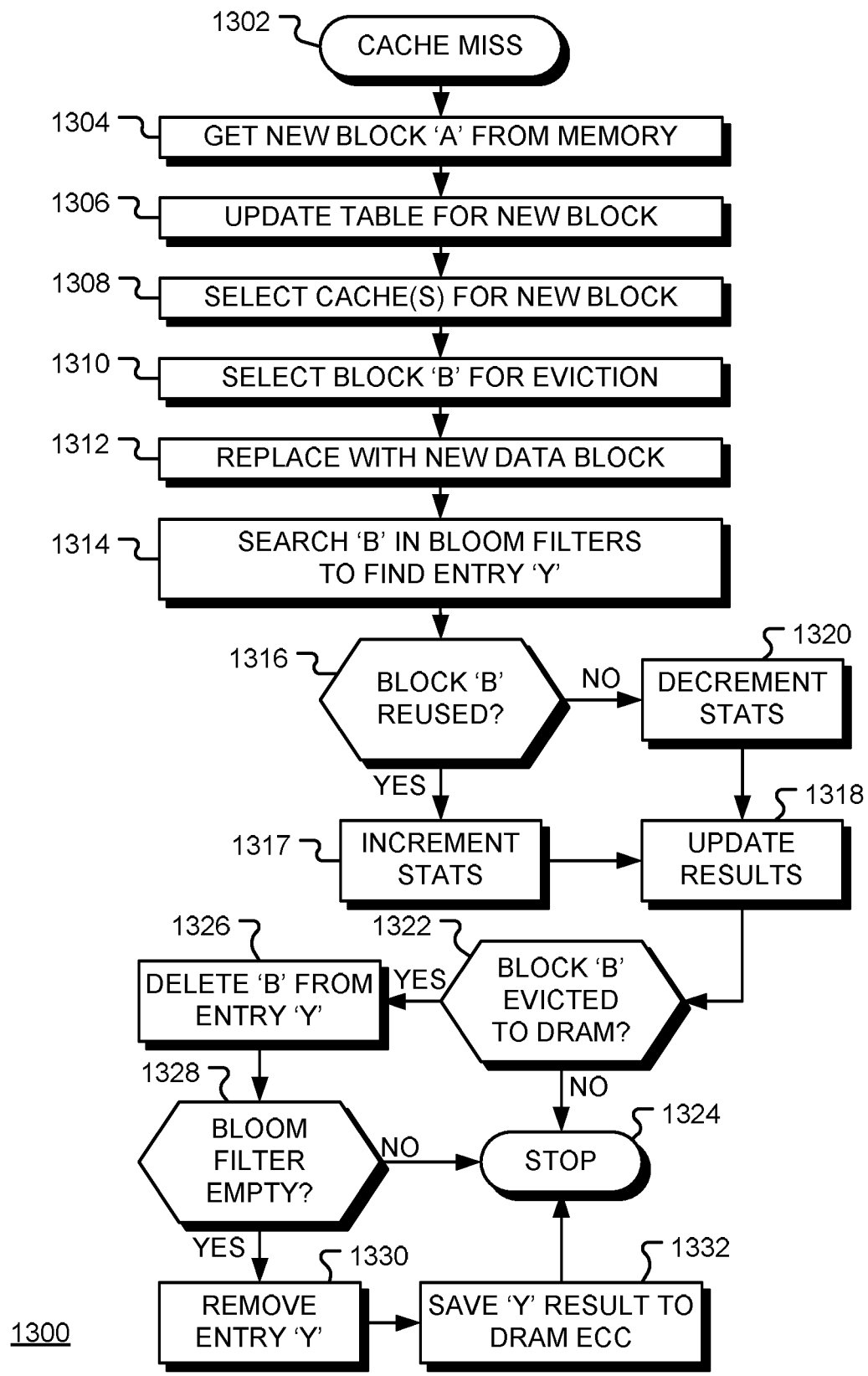
FIG. 13 is a flow chart of a method for cache monitoring and placement, consistent with embodiments of the disclosure.

FIG. 13 is a flow chart of a method 1300 for placing a data block in the cache system and updating the predictor table in the event of a cache miss for instruction pointer 'X; and data address 'A'. Following a cache miss at block 1302, the requested data is retrieved from memory (or a lower level cache) at block 1304. The predictor table is updated for the new entry at block 1306 (as discussed above with reference to FIG. 12, for example). At block 1308, the destination cache or caches for the retrieved data block are determined from the prediction results in the table entry corresponding to the instruction pointer 'X'. The results may be a bitmap indicating which caches, if any, should receive the new data. Assuming the cache is already full, the cache line for eviction is selected at block 1310. The victim selection may be made using a SRRIP policy for example. The data address of the data in the selected cache line is denoted as 'B'. At block 1312, the evicted line is replaced with the new line. The reuse bit for the line is reset to zero. The priority level may be set according to the prediction results for instruction 'A'. At block 1314, the address 'B' is searched in the Bloom filters of the predictor table to find an entry with IP 'Y'. If, as depicted by the positive branch from decision block 1316, the reuse bit for address 'B' is set, indicating that the data was accessed after being inserted in the cache, the corresponding statistics counter for this cache in entry 'Y' is incremented at block 1317. If the counter exceeds a threshold value, the priority level for instruction 'Y' is updated at block 1320. For example, if the statistics counter value is above a threshold value, the result may change (as illustrated in FIG. 6, for example). If, as depicted by the negative branch from decision block 1316, the reuse bit for address 'B' is not set, indicating that the data was not accessed after being inserted in the cache, the corresponding statistics counter for this cache in entry 'Y' is decremented at block 1318. If the counter falls below a threshold value, the priority level for instruction 'Y' is updated at block 1320. For example, the instruction may change from 'high priority' to 'low priority', or from 'low priority' to 'bypass'. Flow continues to decision block 1322. If block with address 'B' has been evicted to memory (rather than to a lower level cache), as depicted by the positive branch from decision block 1322, the address 'B' is deleted from the Bloom filter in the entry for instruction 'Y' at block 1326. Otherwise the method terminates at block 1324. If the Bloom filter is empty (e.g. all zeroes), as depicted by the positive branch from decision block 1328, the entry for 'Y' is removed from the predictor table at block 1330 and the results of the entry are save to an ECC portion of memory at block 1332. The method terminates at block 1324.

The methods described above may be implemented in logic in a memory apparatus. The logic may be custom logic, however, some or all elements of the method could be implemented in configurable logic, such as programmable processor or field programmable gate array (FPGA).

Those skilled in the art will recognize that the present disclosure may be implemented using a programmed processor, reconfigurable hardware components, dedicated hardware components or combinations thereof. Similarly, general purpose computers, microprocessor based computers, micro-controllers, optical computers, analog computers, dedicated processors and/or dedicated hard wired logic may be used to construct alternative equivalent embodiments of the present disclosure.

Further, the components of the data processing system described above may be described by instructions of a Hardware Description Language. These instructions may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A memory apparatus comprising: a cache system comprising one or more caches, each cache configured to store a plurality of cache lines, each cache line comprising an address tag and a data block, where a cache line is filled in response to a memory instruction from a cache client; and a cache monitor comprising: a predictor table, where an entry in the predictor table comprises an instruction identifier that associates the entry with a memory instruction and, for each of the one or more caches, a reuse counter; and update logic, where the update logic is configured to update a reuse counter of an entry in the predictor table dependent upon cache behavior in response to memory instructions; where, responsive to execution of a memory instruction having a first instruction identifier, for data at a first data address, data at the first data address is stored in the cache system dependent upon reuse counter values in an entry of the predictor table, the entry associated with the first instruction identifier.

2. The memory apparatus of item 1, where a reuse counter of an entry in the prediction table associated with a memory instruction is incremented when the memory instruction produces a cache hit and decremented when the memory instruction produces a cache miss.

3. The memory apparatus of item 1, where an entry in the predictor table further comprises a prediction result for each of the one or more caches, a prediction result, and where the update logic is further configured to update a prediction result of an entry dependent upon values of the reuse counters of the entry.

4. The memory apparatus of item 3, further comprising a backing memory, where the backing memory is configured to access an instruction and associated metadata in a single transaction, and where the metadata comprises a prediction result associated with the instruction.

5. The memory apparatus of item 1, where an entry in the predictor table associated with a first memory instruction further comprises a probabilistic data structure indicative of data addresses accessed by the first memory instruction.

6. The memory apparatus of item 1, where the probabilistic data structure in the predictor table comprises a Bloom filter, and where the cache monitor of the memory apparatus further comprises: Bloom filter logic configured to update the Bloom filter of an entry associated with the first memory instruction with an identifier of the first data address.

7. The memory apparatus of item 6, where, responsive to eviction, from a cache of the one or more caches, of data at a second data address, a reuse counter of an entry of the prediction table for which the Bloom filter contains the second address is incremented if the data at the second address was reused in the cache and decremented if the data at the second address was not reused in the cache.

8. The memory apparatus of item 1, where the cache system comprises a multi-tier cache.

9. The memory apparatus of item 8, where a cache of the multi-tier cache is a shared cache, accessed from a plurality of virtual address spaces, where an entry in the predictor table further comprises an address space identifier associated with the virtual address space from which the memory instruction was issued.

10. A non-transient computer readable medium containing instructions of a hardware language that define the apparatus of item 1.

11. A method for guiding placement of data blocks in a cache system, comprising: when data at a first data address, accessed by a memory instruction having a first instruction identifier, is not stored in a cache of the cache system: accessing a prediction table dependent upon the first instruction identifier to retrieve reuse data associated with the first memory instruction and the cache; retrieving a data block containing the first data from a lower order cache of the multi-tier cache or a memory; and inserting the data block into one or more caches of the cache system or bypassing the cache system dependent upon the reuse data.

12. The method of item 11, where an entry in the prediction table comprises an instruction identifier and, for each cache of the cache system, a reuse counter, the method further comprising: when data at the first data address, accessed by the memory instruction having the first instruction identifier, is stored in a cache of the cache system: incrementing the reuse counter in an entry of the prediction table associated with the first instruction identifier and the cache; and when data at the first data address, accessed by the memory instruction having the first instruction identifier, is not stored in a cache of the cache system: decrementing the reuse counter in the entry of the prediction table associated with the first instruction identifier and the cache.

13. The method of item 11, where an entry in the prediction table comprises an instruction identifier, a probabilistic data structure and, for each cache of the cache system, a reuse counter, the method further comprising: when data at the first data address, accessed by the memory instruction having the first instruction identifier, is not stored in the cache system, adding an identifier of the first data address to the probabilistic data structure of a first entry in the prediction table associated with the first instruction identifier; identifying a second entry of the prediction table for which an identifier of the second data address in stored in the probabilistic data structure; when data at a second data address is evicted from a cache of the cache system: incrementing the reuse counter associated with the cache in the second entry of the prediction table when data at the second data address has been reused in the cache; and decrementing the reuse counter associated with the cache in the second entry of the prediction table when data at the second data address has not been reused in the cache.

14. The method of item 13, where a cache line in a cache of the cache system comprises an address tag, a data block, and a reuse bit, the method further comprising: setting the reuse bit to zero when the cache line is inserted into a cache of the cache system; and setting the reuse bit to one when the cache line is reused, where data at the second data address is determined to have been reused or not dependent upon the reuse bit in an evicted cache line containing the data at the second data address.

15. The method of item 13, further comprising: deleting the second data address from the probabilistic data structure of the second entry; and removing the second entry from the prediction table when the probabilistic data structure is empty.

16. The method of item 11, where an entry in the prediction table comprises an instruction identifier and, for each cache of the cache system, a reuse counter and a prediction result.

17. The method of item 16, further comprising: updating a prediction result in an entry of the prediction table when a corresponding reuse counter crosses a threshold value.

18. The method of item 16, further comprising: periodically updating a prediction result in an entry of the prediction table dependent upon a corresponding reuse counter.

19. The method of item 16, further comprising storing a prediction result in backing memory.

20. The method of item 16, further comprising storing a prediction result in a metadata region of an instruction stored in a backing memory.

21. The method of item 16, further comprising storing a prediction result in backing memory when an associated instruction is evicted from an instruction cache.

22. The method of item 11, further comprising: when the first instruction identifier is not stored in prediction table: adding a new entry to the prediction table; setting an instruction identifier of the entry to the first instruction identifier; and resetting reuse data of the entry.

23. The method of item 22, further comprising: when the first instruction identifier is not stored in prediction table: evicting a least recently used entry from the prediction table; and replacing the evicted entry with the new entry.

24. The method of item 23, further comprising: saving a result of the evicted entry in a metadata region of a backing memory.

25. A method for placing data in a cache system comprising one or more caches, the method comprising: monitoring cache behavior responsive to memory instruction issued by a cache client; storing one or more indicators of the cache behavior in a prediction table; in the event of a cache miss of a first memory instruction: accessing an entry of the prediction table associated with the first memory instruction to retrieve an indicator of prior cache behavior in response to the first memory instruction; and determining when a retrieved data block should be placed in a cache of the one or more caches and when the retrieved data block should bypass the cache dependent upon the indicator of prior cache behavior.

26. The method of item 25, where the cache behavior is monitored when a cache line is evicted from a cache of the cache system.

27. The method of item 25, where the cache behavior is monitored when a memory instruction is executed.

28. The method of item 25, where the cache behavior is monitored during one or more learning phases, and determining when a retrieved data block should be placed in a cache of the one or more caches and when the retrieved data block should bypass the cache is performed during an inference phase and is dependent upon cache behavior monitored in a prior learning phase.

29. The method of item 25, where determining when a retrieved data block should be placed in a cache of the one or more caches and when the retrieved data block should bypass the cache is occasionally performed at random.

The invention claimed is:
1. A method for guiding placement of data blocks in a cache system, comprising:
    executing a memory instruction to access data associated with a first data address in a memory, the memory instruction having a first instruction identifier, where the data associated with the first data address is not stored in a cache of the cache system;
    accessing a prediction table dependent upon the first instruction identifier to retrieve reuse data associated with the memory instruction and the cache;
    retrieving a data block containing the data associated with the first data address from a lower order cache of the multi-tier cache or the memory; and
    inserting the data block into one or more caches of the cache system or bypassing the cache system dependent upon the reuse data.

2. The method of claim 1, where an entry in the prediction table comprises an instruction identifier and, for each cache of the cache system, a reuse counter, the method further comprising:
    executing the memory instruction to access data associated with a second data address, where the data associated with the second data address is stored in the cache of the cache system;
    responsive to executing the memory instruction to access the data associated with the second data address, incrementing the reuse counter in an entry of the prediction table associated with the first instruction identifier and the cache; and responsive to executing the memory instruction to access the data associated with the first data address, decrementing the reuse counter in the entry of the prediction table associated with the first instruction identifier and the cache.

3. The method of claim 1, where an entry in the prediction table comprises an instruction identifier, a probabilistic data structure and, for each cache of the cache system, a reuse counter, the method further comprising:
adding an identifier of the first data address to the probabilistic data structure of a first entry in the prediction table associated with the first instruction identifier;
evicting data associated with a second data address from the cache of the cache system;
identifying a second entry of the prediction table for which an identifier of the second data address is stored in the probabilistic data structure;
incrementing the reuse counter associated with the cache in the second entry of the prediction table when data at the second data address has been reused in the cache; and
decrementing the reuse counter associated with the cache in the second entry of the prediction table when data at the second data address has not been reused in the cache.

4. The method of claim 3, further comprising:
inserting the data block into a cache line in a cache of the cache system, the cache line comprising an address tag, a data block, and a reuse bit;
setting the reuse bit to zero when the cache line is inserted into a cache of the cache system;
setting the reuse bit to one when the cache line is reused; and
determining data at the second data address to have been reused or not dependent upon the reuse bit in an evicted cache line containing the data at the second data address.

5. The method of claim 3, further comprising:
deleting the second data address from the probabilistic data structure of the second entry; and
removing the second entry from the prediction table when the probabilistic data structure is empty.

6. The method of claim 1, where an entry in the prediction table comprises an instruction identifier and, for each cache of the cache system, a reuse counter and a prediction result.

7. The method of claim 6, further comprising:
updating a prediction result in an entry of the prediction table when a corresponding reuse counter crosses a threshold value.

8. The method of claim 6, further comprising:
periodically updating a prediction result in an entry of the prediction table dependent upon a corresponding reuse counter.

9. The method of claim 6, further comprising storing a prediction result in backing memory.

10. The method of claim 6, further comprising storing a prediction result in a metadata region of an instruction stored in a backing memory.

11. The method of claim 9, further comprising storing a prediction result in backing memory when an associated instruction is evicted from an instruction cache.

12. The method of claim 1, further comprising:
adding a new entry to the prediction table for the first instruction identifier;
setting an instruction identifier of the entry to the first instruction identifier; and
resetting reuse data of the entry.

13. The method of claim 12, further comprising:
evicting a least recently used entry from the prediction table; and
replacing the evicted entry with the new entry.

14. The method of claim 13, further comprising:
saving a result of the evicted entry in a metadata region of a backing memory.

15. A method for placing data in a cache system comprising one or more caches, the method comprising:
monitoring cache behavior responsive to execution of a plurality of memory instructions issued by a cache client;
storing one or more indicators of the cache behavior in entries of a prediction table, where a first entry in the prediction table is associated with an instruction identifier of a first memory instruction of the plurality of memory instructions;
detecting a cache miss of a first memory instruction:
accessing the first entry of the prediction table to retrieve an indicator of prior cache behavior in response to the first memory instruction; and
placing a data block, retrieved in response to the first memory instruction, in a cache of the one or more caches or bypassing the cache based upon the indicator of prior cache behavior.

16. The method of claim 15, where the cache behavior is monitored when a cache line is evicted from a cache of the cache system.

17. The method of claim 15, where the cache behavior is monitored when a memory instruction is executed.

18. The method of claim 15, where
the cache behavior is monitored during one or more learning phases, and
placing the data block in the cache of the one or more caches or bypassing the cache based upon the indicator of prior cache behavior is performed during an inference phase and is dependent upon cache behavior monitored in a prior learning phase.

19. The method of claim 15, where determining when a retrieved data block should be placed in a cache of the one or more caches and when the retrieved data block should bypass the cache is occasionally performed at random.

* * * * *